United States Patent

He et al.

(10) Patent No.: US 8,554,393 B2
(45) Date of Patent: Oct. 8, 2013

(54) AIRSPACE AWARENESS ENHANCEMENT SYSTEM AND METHOD

(75) Inventors: Gang He, Morristown, NJ (US); Jary Engels, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 1048 days.

(21) Appl. No.: 12/566,942

(22) Filed: Sep. 25, 2009

(65) Prior Publication Data

US 2011/0077804 A1    Mar. 31, 2011

(51) Int. Cl.
*G06F 7/70* (2006.01)

(52) U.S. Cl.
USPC .......................................................... 701/14

(58) Field of Classification Search
USPC .......................................... 345/419; 701/14
See application file for complete search history.

(56) References Cited

U.S. PATENT DOCUMENTS

| | | |
|---|---|---|
| 5,057,835 A | 10/1991 | Factor et al. |
| 6,289,277 B1 | 9/2001 | Feyereisen et al. |
| 6,661,353 B1 | 12/2003 | Gopen |
| 6,917,860 B1 | 7/2005 | Robinson et al. |
| 7,039,505 B1 | 5/2006 | Southard et al. |
| 7,330,780 B2 | 2/2008 | Von Viebahn et al. |
| 7,353,091 B2 | 4/2008 | Servantie et al. |
| 7,505,835 B2 * | 3/2009 | Brust et al. ........................ 701/3 |
| 7,515,069 B2 | 4/2009 | Dorneich et al. |
| 2003/0169301 A1 | 9/2003 | McCauley et al. |
| 2003/0193411 A1 | 10/2003 | Price |
| 2005/0200501 A1 | 9/2005 | Smith |
| 2006/0004497 A1 | 1/2006 | Bull |
| 2007/0050101 A1 | 3/2007 | Sacle et al. |
| 2007/0150117 A1 | 6/2007 | Bitar et al. |
| 2007/0276553 A1 | 11/2007 | Bitar et al. |
| 2007/0285283 A1 | 12/2007 | Bitar et al. |
| 2008/0051947 A1 | 2/2008 | Kemp |
| 2008/0147320 A1* | 6/2008 | Burch ........................... 701/211 |

* cited by examiner

*Primary Examiner* — Mark Hellner
(74) *Attorney, Agent, or Firm* — Ingrassia Fisher & Lorenz, P.C.

(57) ABSTRACT

A display system and method for an aircraft renders various airspaces and associated airspace types on an aircraft display device. An image is selectively rendering on the aircraft display device that includes at least an airspace boundary graphic representative of at least a portion of the boundary for the airspace, and a textual airspace type designation label representative of the airspace type of the airspace.

18 Claims, 5 Drawing Sheets

AIRSPACE AWARENESS ENHANCEMENT SYSTEM AND METHOD

TECHNICAL FIELD

The present invention relates to an aircraft display system and, more particularly, to a system and method for providing improved airspace awareness on an aircraft display device.

BACKGROUND

Airspace that is navigable by aircraft is divided into different types (e.g., classes and/or categories) of three-dimensional sections. Most nations typify airspace sections consistent with those delineated by the International Civil Aviation Organization (ICAO). Some nations, including the United States, include additional airspace types, generally referred to as Special Use Airspace, for which additional rules and restrictions may apply.

In the United States, there are two general categories of airspace—regulatory and non-regulatory. The regulatory airspace is divided into eight different airspace types, a are referred to as Class A, B, C, D, E, and G airspace areas, restricted airspace areas, and prohibited airspace areas. The non-regulatory airspace are divided into four different airspace types, which are referred to as military operations areas (MOAs), warning areas, alert areas, and controlled firing areas. The regulatory and non-regulatory airspace categories may additionally include airspace subcategories. These airspace subcategories are referred to as controlled airspace, uncontrolled airspace, special use airspace, and other airspace.

The categories and subcategories assigned to particular airspaces are dictated by several factors. These include, for example, the complexity or density of aircraft movements, the nature of the operations conducted within the airspace, the level of safety required, and the national and public interest. It is thusly important that pilots be familiar with the operational requirements for each of the various airspace types, and to be aware if the aircraft is within, or is about to enter, a particular type of airspace.

Presently, aircraft cockpit display systems do not provide intuitive visual feedback, if at all, to a pilot regarding airspace awareness. That is, many aircraft cockpit displays do not provide an intuitive manner in which to visually indicate to a pilot that the aircraft is within, or is about to enter, a particular type of airspace.

Hence, there is a need for a system and method for displaying various airspaces to a pilot, to thereby enhanced awareness that the aircraft is within, or is about to enter, a particular type of airspace. The present invention addresses at least this need.

BRIEF SUMMARY

In one embodiment, and by way of example only, a method of selectively rendering an airspace on an aircraft display device includes determining a current state of the aircraft and retrieving airspace data from a database. The retrieved airspace data are processed to determine a boundary of an airspace and an airspace type of the airspace. Based on the current state of the aircraft, an image is selectively rendered on the aircraft display device that includes at least an airspace boundary graphic representative of at least a portion of the boundary for the airspace, and a textual airspace type designation label representative of the airspace type of the airspace.

In another exemplary embodiment, a method of selectively rendering an airspace on an aircraft display device includes determining a current state of the aircraft and retrieving airspace data from a database. The current state of the aircraft includes at least aircraft lateral position, aircraft altitude, aircraft lateral direction, aircraft vertical direction, aircraft lateral speed, and aircraft vertical speed. The retrieved airspace data are processed to determine a boundary of an airspace. Based on the current state of the aircraft, a determination is made as to whether the aircraft will enter the airspace within a predetermined amount of time. Based on the current state of the aircraft, an image is selectively rendered on the aircraft display device that includes at least an airspace boundary graphic representative of at least a portion of the boundary for the airspace. The boundary graphic is rendered on the display device in accordance with a first display paradigm if the aircraft will not enter the airspace within the predetermined amount of time, and in accordance with a second display paradigm if the aircraft will enter the airspace within the predetermined amount of time.

In yet another exemplary embodiment, a method of selectively rendering an airspace on an aircraft display device includes determining a current state of the aircraft and retrieving airspace data from a database. The retrieved airspace data are processed to determine a boundary of an airspace. An image is rendered on the aircraft display device that includes a cursor and at least an airspace boundary graphic representative of at least a portion of the boundary for the airspace. The airspace boundary graphic is rendered in accordance with a first display paradigm. A determination is made as to whether the cursor is either on or within the boundary for the airspace. The airspace boundary graphic is rendered in accordance with a second display paradigm when the cursor is either on or within the boundary for the airspace.

BRIEF DESCRIPTION OF THE DRAWINGS

The present invention will hereinafter be described in conjunction with the appended drawing figures, wherein like numerals denote like elements, and wherein.

DETAILED DESCRIPTION

Figure 1:
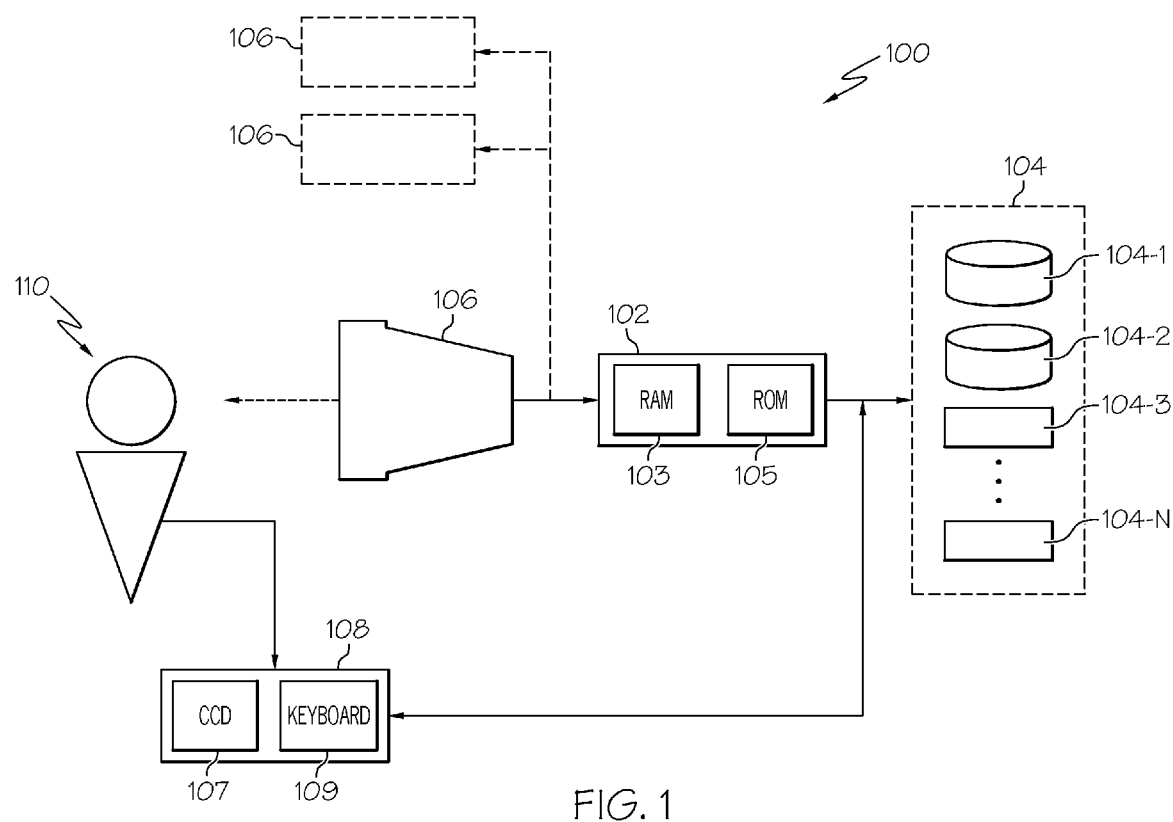
FIG. 1 is a functional block diagram of a flight deck display system according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

A functional block diagram of an exemplary avionics display system 100 is depicted in FIG. 1, and includes a processor 102, a plurality of data sources 104 (e.g., 104-1, 104-2, 104-3 . . . , 104-N), and a display device 106. The processor 102 is in operable communication with the data sources 104 and the display device 106. The processor 102 is coupled to receive various types of data from the data sources 104. It will be appreciated that the data may vary, but in the depicted embodiment the data includes at least various aircraft inertial and navigation data, airspace data and, at least in some embodiments, terrain data. The processor 102 is configured, in response to at least these data, to render various images on the display device 106.

The processor 102 may be any one (or a plurality) of numerous known general-purpose microprocessors or application specific processor(s) that operates in response to program instructions. In the depicted embodiment, the processor 102 includes on-board RAM (random access memory) 103, and on-board ROM (read only memory) 105. The program instructions that control the processor 102 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used. In this respect, the processor 102 may include or cooperate with any number of software programs (e.g., avionics display programs) or instructions designed to carry out various methods, process tasks, calculations, and control/display functions described below.

The data sources 104 supply at least the above-mentioned data to the processor 102. The data sources 104 may include a wide variety of databases, devices, and systems, some or all of which may reside onboard the aircraft or at one or more remote locations. By way of example, the data sources 104 may include one or more of a runway awareness and advisory system (RAAS), an instrument landing system (ILS), a flight director system, a weather data system, a terrain avoidance and warning system, a traffic and collision avoidance system, a terrain database, an inertial reference system, a navigation database, and a flight management system. The data sources 104 may also include mode, position, and/or detection elements (e.g., gyroscopes, global positioning systems, inertial reference systems, avionics sensors, etc.) capable of determining the mode and/or position of the aircraft relative to one or more reference locations, points, planes, or navigation aids, as well as the current state of the aircraft. As used herein, "current state of the aircraft" includes at least the aircraft lateral position, aircraft altitude, aircraft lateral direction, aircraft vertical direction, aircraft lateral speed, and aircraft vertical speed.

In the depicted embodiment, at least one of the data sources 104 includes a database 104-1 having at least airspace data stored therein. The airspace data includes data representative of various kinds of information associated with various airspaces. For example, the airspace data includes at least data representative of the locations, lateral boundaries, vertical boundaries, and type (e.g., class or category) of various airspaces, and may also include various other types of information associated with one or more airspaces. The manner in which the airspace data are used in the system 100 is disclosed in greater detail further below.

The display device 106 is used to display various images and data, in a graphic, iconic, and/or a textual format, and to supply visual feedback to the user 110. It will be appreciated that the display device 106 may be implemented using any one of numerous known displays suitable for rendering graphic, iconic, and/or text data in a format viewable by the user 110. Non-limiting examples of such displays include various cathode ray tube (CRT) displays, and various flat panel displays, such as various types of LCD (liquid crystal display), TFT (thin film transistor) displays, and OLED (organic light emitting diode) displays. The display may additionally be based on a panel mounted display, a HUD projection, or any known technology. In an exemplary embodiment, display device 106 includes a panel display. It is further noted that the system 100 could be implemented with more than one display device 106. For example, the system 100 could be implemented with two or more display devices 106.

No matter the number or particular type of display that is used to implement the display device 106, it was noted above that the processor 102 is responsive to the various data it receives to render various images on the display device 106. The images that the processor 102 renders on the display device 106 will depend, at least in part, on the particular functional display being implemented. For example, the display device 106 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, or a three-dimensional TAAS display, just to name a few. Moreover, and as FIG. 1 depicts in phantom, the system 100 may be implemented with multiple display devices 106, each of which may implement one or more these different, non-limiting functional displays. The display device 106 may also be implemented in an electronic flight bag (EFB) and, in some instance, some or all of the system 100 may be implemented in an EFB.

The depicted system 100 also preferably includes a user interface 108. The user interface 108 is in operable communication with the processor 102 and is configured to receive input from a user 110 (e.g., a pilot) and, in response to the user input, supply command signals to the processor 102. The user interface 108 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 112 includes a CCD 107 and a keyboard 109. The user 110 uses the CCD 107 to, among other things, move a cursor symbol that may be rendered on the display device 106, and may use the keyboard 109 to, among other things, input textual data.

Figure 2:
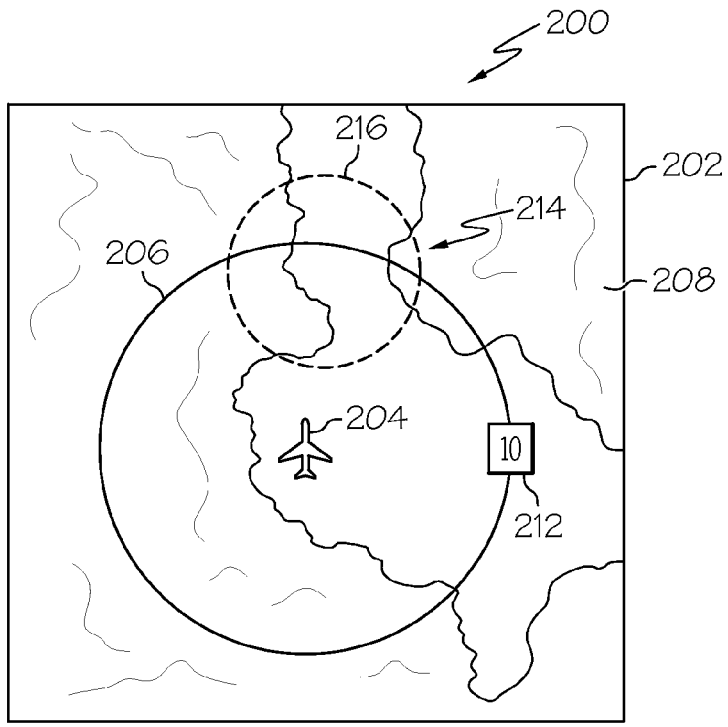
FIGS. 2 and 3 are exemplary representations of images that may rendered on a display device in the system of FIG. 1.

Referring now to FIG. 2, an exemplary image that may be rendered on the display device 106 when it is implementing a MFD is depicted and will now be described. Before doing so, it is noted that the depicted MFD image 200 is merely exemplary of one embodiment, and that it could be variously implemented. It is additionally noted that not all of the rendered images that are depicted in FIG. 2 (and others) will be described, and that various other images that are not depicted (or further described) could be rendered on the on display device 106, if needed or desired.

The depicted MFD image 200 is rendered to display a lateral map 202. The lateral map 202 includes a top-down aircraft symbol 204, one or more range rings 206, and terrain 208. The lateral map 202 may additionally be rendered with various other features including, but not limited to, weather-related graphics, political boundaries, and navigation aids, just to name a few. It is noted, however, that these and other additional features are, for clarity, not shown in FIG. 2. The top-down aircraft symbol 204 is rendered at a position that is representative of aircraft position relative to the rendered terrain. The range rings 206, only one of which is shown in FIG. 2, indicate nautical distance from the top-down aircraft symbol 204. In the illustrated embodiment, the range ring 206 includes a range indicator 212, which displays the lateral distance from the aircraft's present position to the position on the lateral map 202 that corresponds to the range ring 206 (e.g., 10 nautical miles).

As FIG. 2 additionally depicts, the lateral map 200 is rendered to at least selectively include one or more airspaces 214. The airspaces 214 are defined by lateral airspace boundaries that, when rendered, are rendered as airspace boundary graphics 216 in accordance with either a first display paradigm or second display paradigm. The first and second display paradigms are sufficiently different that when the airspace boundary graphics 216 are rendered in accordance with the second display paradigm the airspace boundary graphics 216 are displayed in a relatively more prominent manner. It will be appreciated that the first and second display paradigms may vary, but in the depicted embodiment it is seen that when the airspace boundary graphics 216 are rendered in accordance with the first display paradigm, which is the paradigm depicted in FIG. 2, the airspace boundary graphics 216 are rendered in a relatively subdued manner, using relatively thin lines, which may be solid (depicted), dashed, dotted, or the like. Conversely, when the airspace boundary graphics 216 are rendered in accordance with the second display paradigm, which is the paradigm depicted in FIG. 3, the airspace boundary graphics 216 are rendered in what is referred to herein as a "bloomed" manner. As used herein, the term "bloomed" means that the airspace boundary graphics 216 are rendered using relatively thicker and relatively brighter lines. As will be discussed in more detail further below, the second display paradigm may additionally comprise a plurality of additional display paradigms.

The processor 102 commands the display device 106 to render one or more airspaces 214 whenever the airspace over the rendered terrain 208 includes a defined airspace type (e.g., Class A, B, C, D, E, G, or other categorized airspace). Normally, the processor 102 commands the display device 106 to render airspace boundary graphics 216 in accordance with the first paradigm. However, under certain conditions, the processor 102 commands the display device 106 to render airspace boundary graphics 216 in accordance with the second paradigm. The conditions for which the processor 102 commands the display device 106 to render airspace boundary graphics 216 in accordance with the second paradigm will now be described.

One exemplary method that the system 100 implements for selectively displaying one or more airspaces on the display device 106 is depicted in flowchart form in FIG. 4 and will now be described. Before doing so, it is noted that the parenthetical reference numerals used in describing the exemplary method refers to the like-numbered flowchart blocks. It will additionally be appreciated that, although the exemplary method is depicted and described in an order of steps, this is merely exemplary of one particular embodiment and one or more of the steps may be performed simultaneously or in a different order than is explicitly depicted in the flowchart or described herein.

Figure 4:
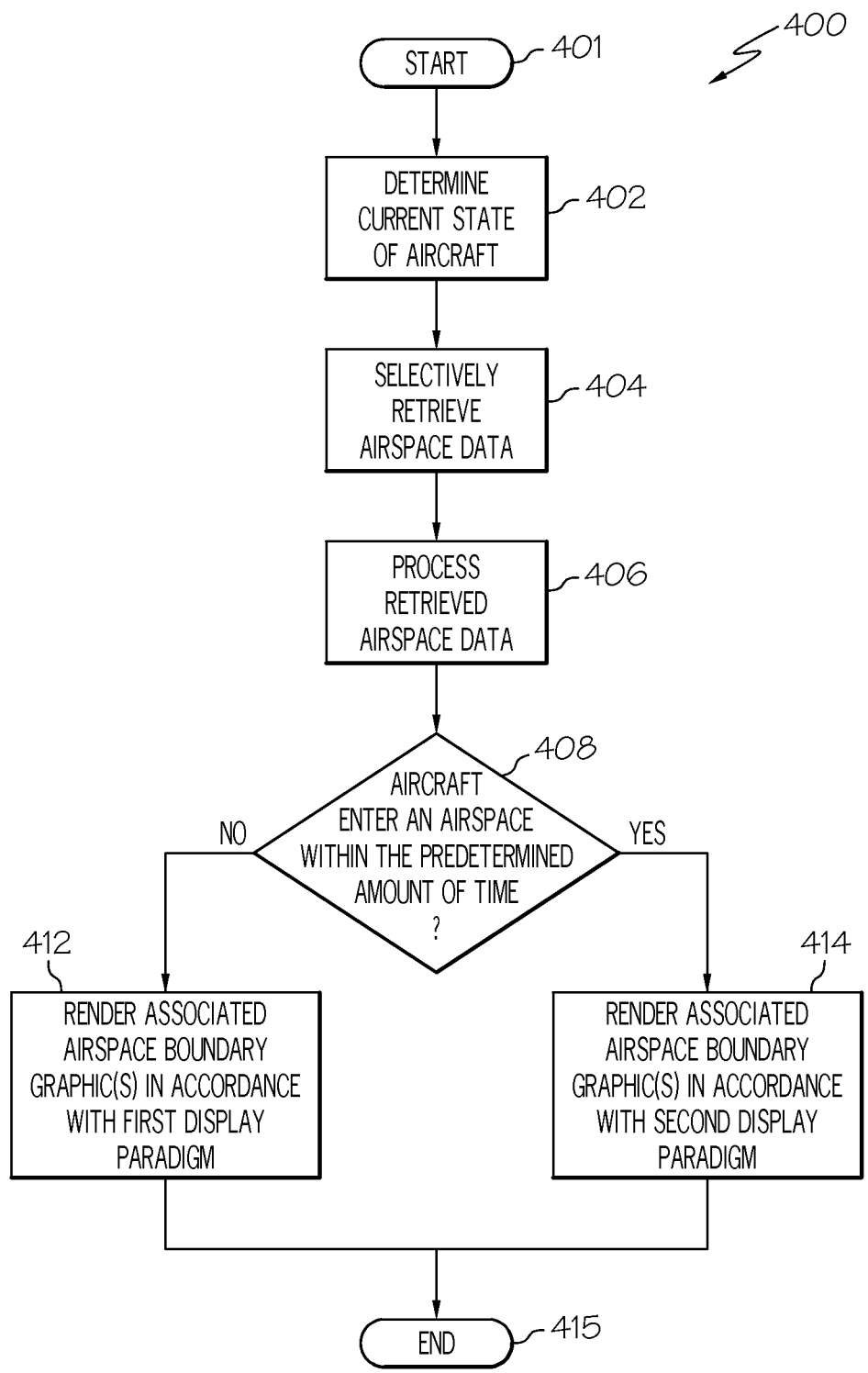
FIG. 4 an exemplary method, in flowchart form, that the system of FIG. 1 implements for selectively displaying one or more airspaces on a display device.

Referring now to FIG. 4, it is seen that the processor 102 (and/or one of the data sources 104), using appropriate data supplied from one or more of the plurality of data sources, determines the current state of the aircraft (402). More specifically, and as was noted above, the processor 102 (and/or one of the data sources 104), based on the data it receives, determines the aircraft lateral position, altitude, lateral direction and speed, vertical direction and speed, and aircraft turn rate (if applicable). The processor 102 (and/or one of the data sources 104) also selectively retrieves airspace data from the database 104-1 (404). The processor 102 (and/or one of the data sources 104) then processes the retrieved airspace data (406) to determine at least the airspace boundary of each airspace 214 that should be appropriately rendered.

The processor 102 (and/or one of the data sources 104) additionally determines, based on the current state of the aircraft, if the aircraft will enter one or more of the airspaces 214 within a predetermined amount of time (408). More specifically, a determination is made as to whether the aircraft is approaching one or more airspaces 214 laterally, vertically, or both, and if it will enter one or more airspaces 214 within the predetermined amount of time. For those airspaces 214 that will not be entered within the predetermined amount of time, the processor 102 commands the display device 106 to render the associated boundary graphics 216 in accordance with the first display paradigm (412) (see FIG. 2). However, for those airspaces that will be entered within the predetermined amount of time, the processor 102 commands the display device 106 to render the associated boundary graphics 216 in accordance with the second display paradigm (414) (see FIG. 3).

Before proceeding further it will be appreciated that the predetermined amount of time may vary. In one exemplary embodiment the predetermined amount of time is 90 seconds (or less). It will nonetheless be appreciated that this is merely exemplary, and that various other amounts of time, less than or greater than 90 seconds, may be used. It will additionally be appreciated that the predetermined amount of time may be a preset value that is stored in the RAM 103, ROM 105, or a non-illustrated memory device, or it may be a user selected time value.

Figure 3:
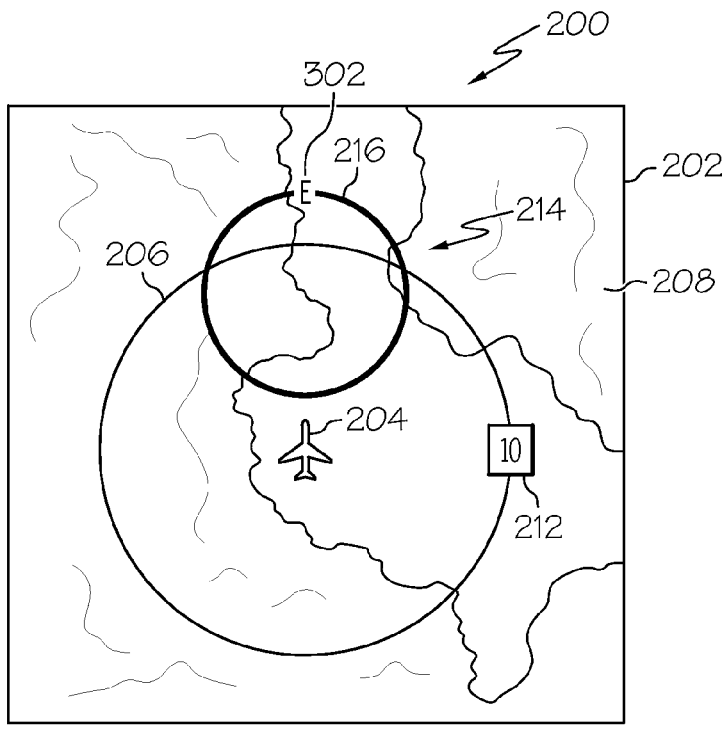

Referring now to FIG. 3, it is additionally seen that whenever an airspace boundary graphic 216 is rendered in accordance with the second display paradigm, indicia may also be rendered. More specifically, a textual airspace type designation label 302 is rendered. The textual airspace type designation label 302 is representative of the specific airspace type. So, for example, in FIG. 3 the airspace 214 that the aircraft will enter within the predetermined time period is a Class E type of airspace. In the depicted embodiment, the textual airspace type designation label 302 is rendered to overly the associated airspace boundary graphic 216. It will be appreciated, however, that this is merely exemplary and that the textual airspace type designation label 302 could be rendered at numerous other suitable locations, but preferably at least proximate the airspace boundary graphic 216. It will additionally be appreciated that the number of textual airspace type designation labels 302 that are rendered may also vary, and that the system 100 preferably implements appropriate declutter algorithms in determining the appropriate number while ensuring that at least one airspace type designation label 302 is visible.

Figure 5:
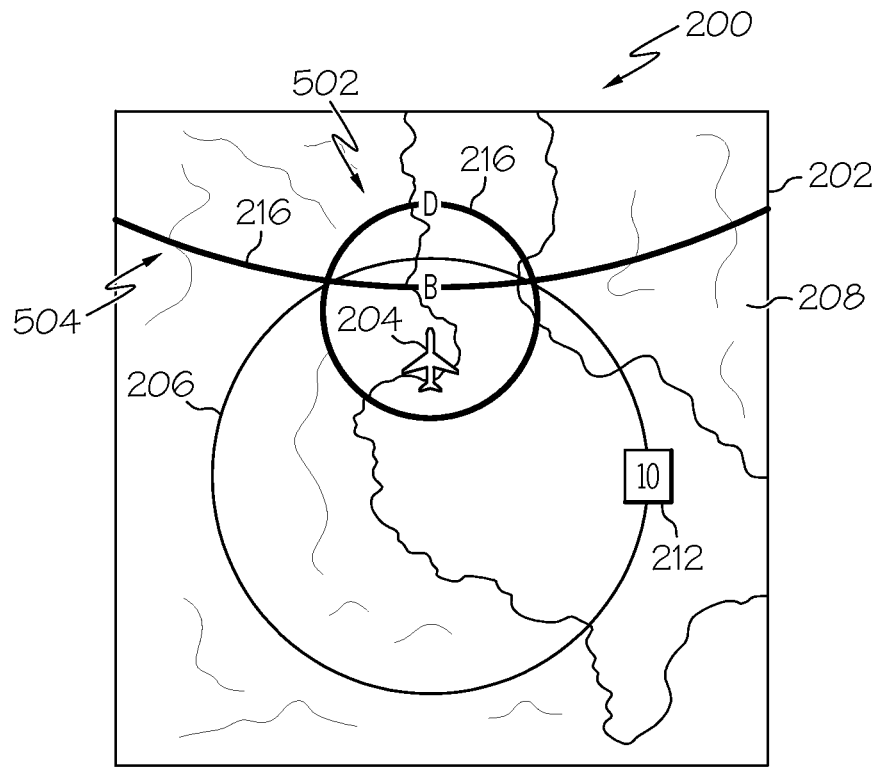
FIG. 5 is another exemplary representation of an image that may rendered on a display device in the system of FIG. 1.

Preferably, the processor 102 is configured to not only command the display device 106 to render an airspace boundary graphic 216 in accordance with the second display paradigm whenever the aircraft is predicted to enter the associated airspace 214 within the predetermined amount of time. Rather, as FIG. 5 depicts, the processor 102 is also preferably configured to command the display device 106 to render an airspace boundary graphic 216 in accordance with the second display paradigm whenever the aircraft is actually within the associated airspace 214. As depicted in FIG. 5, the aircraft is already within a Class D type airspace 502, and is predicted to enter a Class B type airspace 504 within the predetermined amount of time. Thus, the airspace boundary graphics 216 associated with both of these airspaces 502, 504 are rendered in accordance with the second display paradigm.

In some instances, airspace boundary graphics 216 that are rendered in accordance with the second display paradigm may share at least portions of their boundaries. In such instances the airspace 214 that is determined to be most relevant to the current state of the aircraft (or may present a concern) may have its airspace boundary graphic 216 rendered on top of the shared portion of the other one or more boundary graphics 216. The relevance may also be determined based on on whether the aircraft is within an airspace or whether a proper clearance must be obtained prior to entering the airspace.

Figure 6:
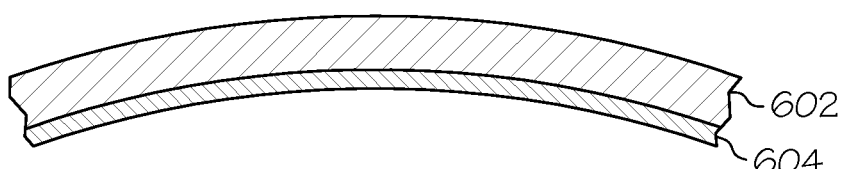
FIG. 6 is a close-up view of a portion of the exemplary image of FIG. 5.

As FIG. 5 additionally depicts, for at least the scale of the presently rendered image 500, the size of the Class B airspace 504 prohibits rendering the associated airspace boundary graphic 216 in its entirety on the display device 106. Hence, a pilot could conceivably be uncertain as to whether the aircraft is approaching the airspace 504 or is actually within the airspace 504. To address such uncertainty, the airspace boundary graphic 216, when rendered in accordance with the second display paradigm is preferably rendered, as noted above, using different display paradigms. The different display paradigms, which are shown more clearly in FIG. 6, are referred to herein as third and fourth display paradigms, and indicate an outer border 602 and an inner border 604, respectively, of the airspace lateral boundary. In the depicted embodiment, the third display paradigm comprises a first color and a first line thickness, and the fourth display paradigm comprises a second color and a second line thickness that is greater than the first line thickness. It will be appreciated, however, that this is merely exemplary of the third and fourth display paradigms, and that various other numbers and types of paradigms may be used to communicate this information to a pilot.

In addition to, or instead of, rendering airspace boundary graphics 216 in accordance with the second display paradigm whenever the aircraft is predicted to enter the associated airspaces 214 within the predetermined amount of time, the processor 102 may also be configured to command the display device 106 to render airspace boundary graphics 216 in accordance with the second display paradigm based on a set of priority rules. That is, the processor 102 (and/or one of the data sources 104) may be configured to prioritize airspaces 214 based, for example, at least partially on the airspace types. For example, the airspace 214 that is most relevant to the current state of the aircraft will be rendered over one or more other airspaces 214. The relevance may also be determined based on whether the aircraft is within an airspace or whether a proper clearance must be obtained prior to entering the airspace.

Figure 7:
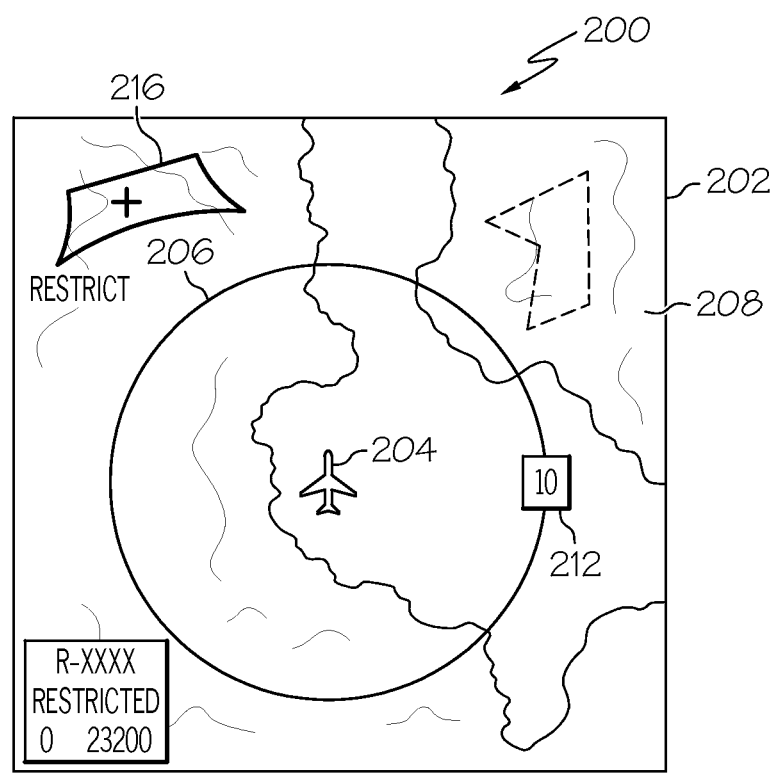
FIG. 7 is yet another exemplary representation of an image that may rendered on a display device in the system of FIG. 1.

With reference now to FIG. 7, yet another method that the system 100 may implement for selectively rendering an airspace 214 in accordance with the second display paradigm will be described. This method may implemented in addition to (preferable), or instead of, one or more of the previously described methods. In any case, with this particular methodology, the processor 102 (and/or other data source 104) determines whether a rendered cursor 702 is on or within the boundary of an airspace 214 that has its boundary graphic 216 rendered in accordance with the first display paradigm. If so, then the processor 102 commands the display device 106 to render the airspace boundary graphic 216 in accordance with the second display paradigm. The processor 102 also preferably commands the display device 106 to render a dialogue box 704 (or text window) that includes specific information associated with the bloomed airspace. The specific information in the dialogue box may vary. Some non-limiting examples of such information includes the controlling agency of the airspace, communication frequencies, altitude limits, airspace type, and required actions, just to name a few.

Preferably, when an airspace boundary graphic 216 is rendered in accordance with the second display paradigm as a result of cursor 702 movement, it is done so only when the cursor 702 has dwelled on or within the boundary of the airspace 214 for at least a minimum dwell time. In this manner, the display paradigm of airspace boundary graphics 216 are not switched between the first and second display paradigms as the cursor 702 moves on or within airspaces 214. It will be appreciated that the dwell time may vary, and may be a preset value that is stored in the RAM 103, ROM 105, or a non-illustrated memory device, or it may be a user selected time value.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method of selectively rendering an airspace on an aircraft display device, the method comprising the steps of:
   determining a current state of the aircraft;
   retrieving airspace data from a database;
   processing the retrieved airspace data to determine a boundary of an airspace and an airspace type of the airspace; and
   based on the current state of the aircraft, selectively rendering an image on the aircraft display device, the image including at least:
   (i) an airspace boundary graphic representative of at least a portion of the boundary for the airspace, and
   (ii) a textual airspace type designation label rendered overlying a portion of the airspace boundary graphic, the textual airspace type designation label representative of the airspace type of the airspace.

2. The method of claim 1, further comprising:
rendering the airspace boundary graphic using a first display paradigm and a second display paradigm, the first display paradigm indicating an outer border of the boundary for the airspace, the second display paradigm indicating an inner border of the boundary for the airspace.

3. The method of claim 2, wherein:
the first display paradigm comprises a first color; and
the second display paradigm comprises a second color.

4. The method of claim 3, wherein:
the first display paradigm further comprises a first thickness of the outer border;
the second display paradigm further comprises a second thickness of the inner border; and
the second thickness is greater than the first thickness.

5. The method of claim 1, further comprising:
determining, based on the current state of the aircraft, if the aircraft will enter the airspace within a predetermined amount of time;
rendering the image on the display device if the aircraft will enter the airspace within the predetermined amount of time; and
not rendering the image on the display device if the aircraft will not enter the airspace within the predetermined amount of time.

6. The method of claim 1, wherein the aircraft state includes aircraft lateral position, aircraft altitude, aircraft lateral direction, aircraft vertical direction, aircraft lateral speed, and aircraft vertical speed.

7. The method of claim 1, further comprising:
selectively rendering the airspace boundary graphic in accordance with a first display paradigm; and
based on the current state of the aircraft, selectively rendering the airspace boundary graphic in accordance with a second display paradigm.

8. The method of claim 1, further comprising:
determining an operational relevance of a plurality of airspaces, based at least in part on the current state of the aircraft;
prioritizing the operational relevance of each airspace; and
selectively rendering one or more airspace boundary graphics in accordance with the second display paradigm,
wherein the airspace having highest priority operational relevance is rendered either before or over airspaces having lower priority operational relevance.

9. The method of claim 1, further comprising:
selectively rendering the airspace boundary graphic in accordance with a first display paradigm;
rendering a cursor on the aircraft display device;
determining if the cursor is either on or within the boundary for the airspace; and
rendering the airspace boundary graphic in accordance with a second display paradigm when the cursor is either on or within the boundary for the airspace.

10. The method of claim 9, further comprising:
rendering textual airspace information associated with the boundary that the cursor is on or within.

11. The method of claim 1, further comprising:
processing the retrieved airspace data to determine a boundary of each of a plurality of airspaces and an airspace type of each of the plurality of airspaces; and based on the current state of the aircraft, selectively rendering an image on the display device that includes at least:
(i) a plurality of airspace boundary graphics, each representative of at least a portion of the boundary for an airspace, and
(ii) a plurality of textual airspace type designation labels, each representative of the airspace type of an airspace.

12. The method of claim 9, further comprising:
prioritizing each of the plurality of airspaces based, at least in part, on the airspace types thereof; and
selectively rendering airspace boundary graphics and textual airspace types based on the prioritization of the plurality of airspaces.

13. A method of selectively rendering an airspace on an aircraft display device, the method comprising the steps of:
determining a current state of the aircraft, the current state of the aircraft including at least aircraft lateral position, aircraft altitude, aircraft lateral direction, aircraft vertical direction, aircraft lateral speed, and aircraft vertical speed;
retrieving airspace data from a database;
processing the retrieved airspace data to determine a boundary of an airspace;
processing the retrieved airspace data to determine an airspace type of the airspace;
determining, based on the current state of the aircraft, if the aircraft will enter the airspace within a predetermined amount of time; and
based on the current state of the aircraft, selectively rendering an image on the aircraft display device, the image including at least an airspace boundary graphic representative of at least a portion of the boundary for the airspace,
wherein the boundary graphic is rendered on the display device in accordance with a first display paradigm if the aircraft will not enter the airspace within the predetermined amount of time, and in accordance with a second display paradigm if the aircraft will enter the airspace within the predetermined amount of time, and
wherein a textual airspace type designation label representative of the airspace type of the airspace is rendered when the boundary graphic is rendered in accordance with the second display paradigm.

14. The method of claim 13, wherein:
when the boundary graphic is rendered in accordance with the second display paradigm, the method further comprises rendering the airspace boundary graphic using a third display paradigm and a fourth display paradigm, the third display paradigm indicating an outer border of the boundary for the airspace, the fourth display paradigm indicating an inner border of the boundary for the airspace.

15. The method of claim 13, further comprising:
rendering a cursor on the aircraft display device;
determining if the cursor is either on or within the boundary for the airspace; and
rendering the airspace boundary graphic in accordance with the second display paradigm when the cursor is either on or within the boundary for the airspace.

16. The method of claim 13, further comprising:
processing the retrieved airspace data to determine a boundary of each of a plurality of airspaces and an airspace type of each of the plurality of airspaces; and
based on the current state of the aircraft, selectively rendering an image on the display device that includes at least:

(i) a plurality of airspace boundary graphics, each representative of at least a portion of the boundary for an airspace, and
(ii) a plurality of textual airspace type designation labels, each representative of the airspace type of an airspace.

17. The method of claim 13, further comprising:
prioritizing each of the plurality of airspaces based, at least in part, on the airspace types thereof; and
based on the prioritization of the plurality of airspaces, selectively rendering airspace boundary graphics and textual airspace types.

18. A method of selectively rendering an airspace on an aircraft display device, the method comprising the steps of:
determining a current state of the aircraft;
retrieving airspace data from a database;
processing the retrieved airspace data to determine a boundary of an airspace;
selectively rendering an image on the aircraft display device, the image including a cursor and at least an airspace boundary graphic representative of at least a portion of the boundary for the airspace, the airspace boundary graphic rendered in accordance with a first display paradigm;
determining if the cursor is either on or within the boundary for the airspace; and
rendering the airspace boundary graphic in accordance with a second display paradigm when the cursor is either on or within the boundary for the airspace.

* * * * *